United States Patent [19]
Gellert

[11] Patent Number: 5,507,635
[45] Date of Patent: Apr. 16, 1996

[54] INJECTION MOLDING NOZZLE WITH SEPARABLE CORE AND ONE-PIECE COLLAR

[76] Inventor: Jobst U. Gellert, 7A Prince Street, Georgetown, Ontario, Canada, L7G 2X1

[21] Appl. No.: 364,962

[22] Filed: Dec. 28, 1994

[30] Foreign Application Priority Data

Dec. 7, 1994 [CA] Canada .................................. 2137702

[51] Int. Cl.⁶ .................................................. B29C 45/20
[52] U.S. Cl. ...................... 425/190; 264/328.15; 425/549
[58] Field of Search ...................... 425/549, 190; 264/328.15

[56] References Cited

U.S. PATENT DOCUMENTS 4,403,405  9/1983  Gellert ...................................... 29/611
4,663,811  5/1987  Gellert ...................................... 425/549

*Primary Examiner*—Tim Heitbrink
*Attorney, Agent, or Firm*—Dalesman & Company

[57] ABSTRACT

An injection molding nozzle with an elongated body removably seated in a one-piece outer collar. The outer collar has a circular insulation flange which seats in the mold to locate the nozzle. The elongated body has an electrical heating element coiled around a central melt channel. Terminal portions of the heating element extend outwardly through a U-shaped opening in the outer collar into a ceramic connector. The connector is secured in place by an inner lip which slides into a groove around the U-shaped opening.

3 Claims, 2 Drawing Sheets

INJECTION MOLDING NOZZLE WITH SEPARABLE CORE AND ONE-PIECE COLLAR

BACKGROUND OF THE INVENTION

This invention relates generally to injection molding and more particularly to an injection molding nozzle with an elongated central body removably seated in a one-piece outer collar.

Injection molding nozzles having an integral electrical heating element and a central bore for conveying thermoplastic melt to a cavity in a cooled mold are well known. In the past, these nozzles have either had a single piece outer collar portion integrally brazed around an elongated central body portion or a two-piece removable outer collar in which a central body is seated. An early example of an integral nozzle is shown in the applicant's U.S. Pat. No. 4,403,405 which issued Sep. 13, 1983 and it has the disadvantage that the entire nozzle is lost if the heating element malfunctions. An example of a nozzle with a two-piece outer collar is shown in the applicant's Canadian patent application serial number 2,127,211 filed Jun. 30, 1994 entitled "Injection Molding Nozzle with Removable Collar Portion". While this has the advantage of being separable, it has the disadvantage and added cost and difficulty of the collar being two-piece.

SUMMARY OF THE INVENTION

Accordingly, it is an object of the present invention to at least partially overcome the disadvantages of the prior art by providing an injection molding nozzle with an elongated central body removably seated in a one-piece outer collar.

To this end, in one of its aspects, the invention provides an injection molding nozzle to be seated in a mold, the nozzle having a melt channel extending therethrough to convey melt frontwardly toward at least one gate extending through the mold to a cavity, the nozzle having an outer collar and an elongated central body with a rear end, the outer collar extending around the central body adjacent the rear end thereof and having a frontwardly extending flange portion to be received in a seat in the mold to locate the nozzle, the improvement wherein the elongated central body and the outer collar are separable, the outer collar is one-piece with a central hole therethrough and a rearward facing seat extending at least partially around the central hole, the central body having a central shaft portion with a rear flange portion extending outwardly therefrom adjacent the rear end of the central body, whereby the central body is removably seated in the outer collar with the central shaft portion extending through the central hole in the outer collar and the rear flange portion sitting against the seat in the central hole in the outer collar.

Further objects and advantages of the invention will appear from the following description taken together with the accompanying drawings.

DETAILED DESCRIPTION OF THE INVENTION

Figure 1:
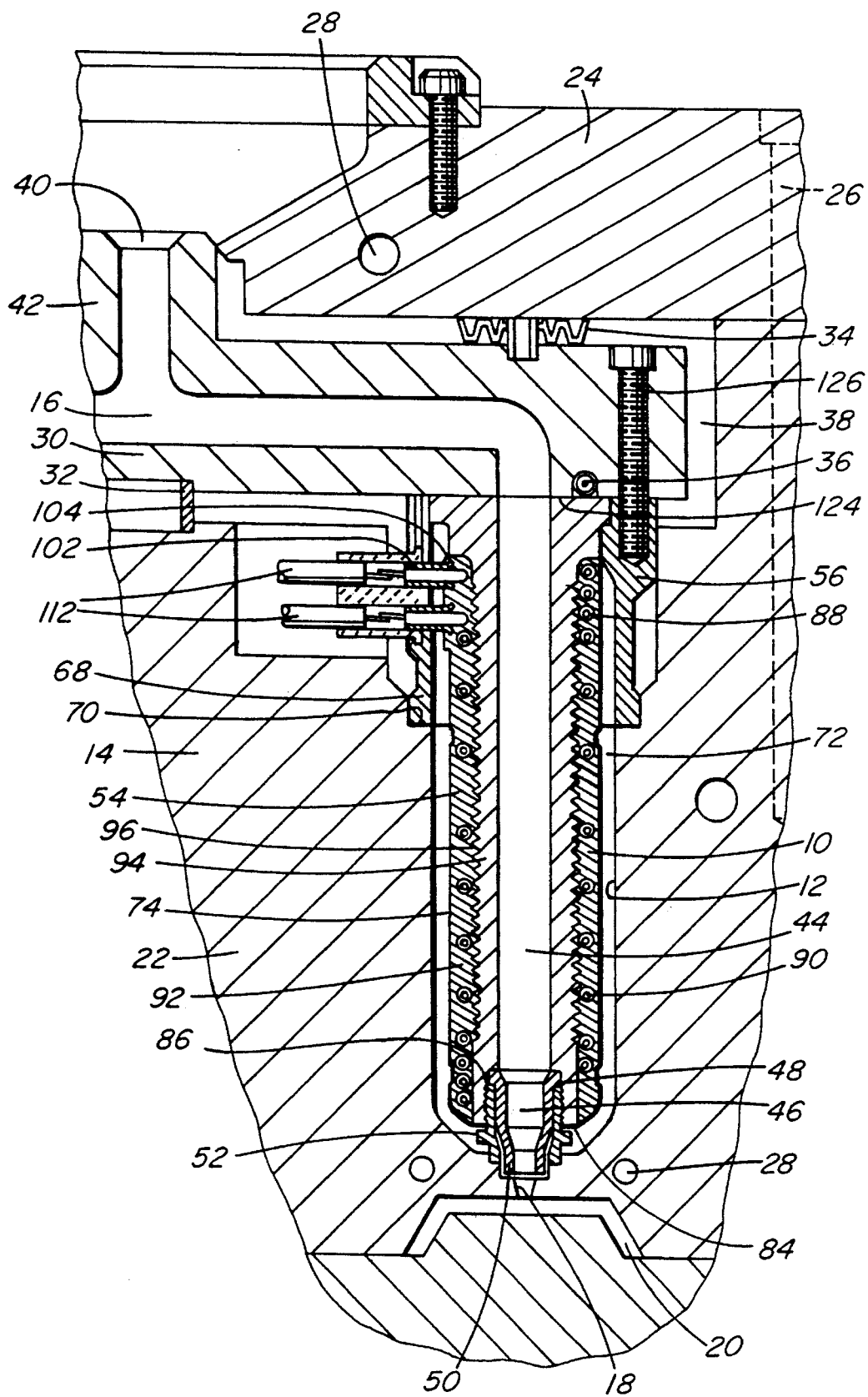
FIG. 1 is a sectional view of a portion of a multi-cavity injection molding system showing a nozzle according to a preferred embodiment of the invention.

Reference is first made to FIG. 1 which shows a portion of a multi-cavity injection molding system or apparatus in which several steel nozzles 10 are seated in openings 12 in a mold 14 to convey pressurized plastic melt through a melt passage 16 to respective gates 18 leading to different cavities 20 in the mold 14. While the mold 14 usually has a greater number of plates depending upon the configuration, in this case only a cavity plate 22 and back plate 24 which are secured together by bolts 26 are shown for ease of illustration. The mold 14 is cooled by pumping cooling water through cooling conduits 28 in the cavity plate 22 and back plate 24.

The nozzles 10 are interconnected by a steel melt distribution manifold 30 which is mounted between the cavity plate 22 and the back plate 24 by a central locating ring 32 and insulative and resilient spacer members 34. The melt distribution manifold 30 is heated by an integral electrical heating element 36 and an insulative air space 38 is provided between it and the surrounding cooled cavity plate 22 and back plate 24. The melt passage 16 receives melt from a molding machine (not shown) through a central inlet 40 in a cylindrical inlet portion 42 of the manifold 30 and branches out in the manifold 30 to pass through a central melt channel 44 in each of the nozzles 10. The melt then flows through an aligned melt duct 46 in a nozzle seal 48 having a hollow inner piece 50 and a threaded outer piece 52 to the gate 18.

Figures 2, 3:
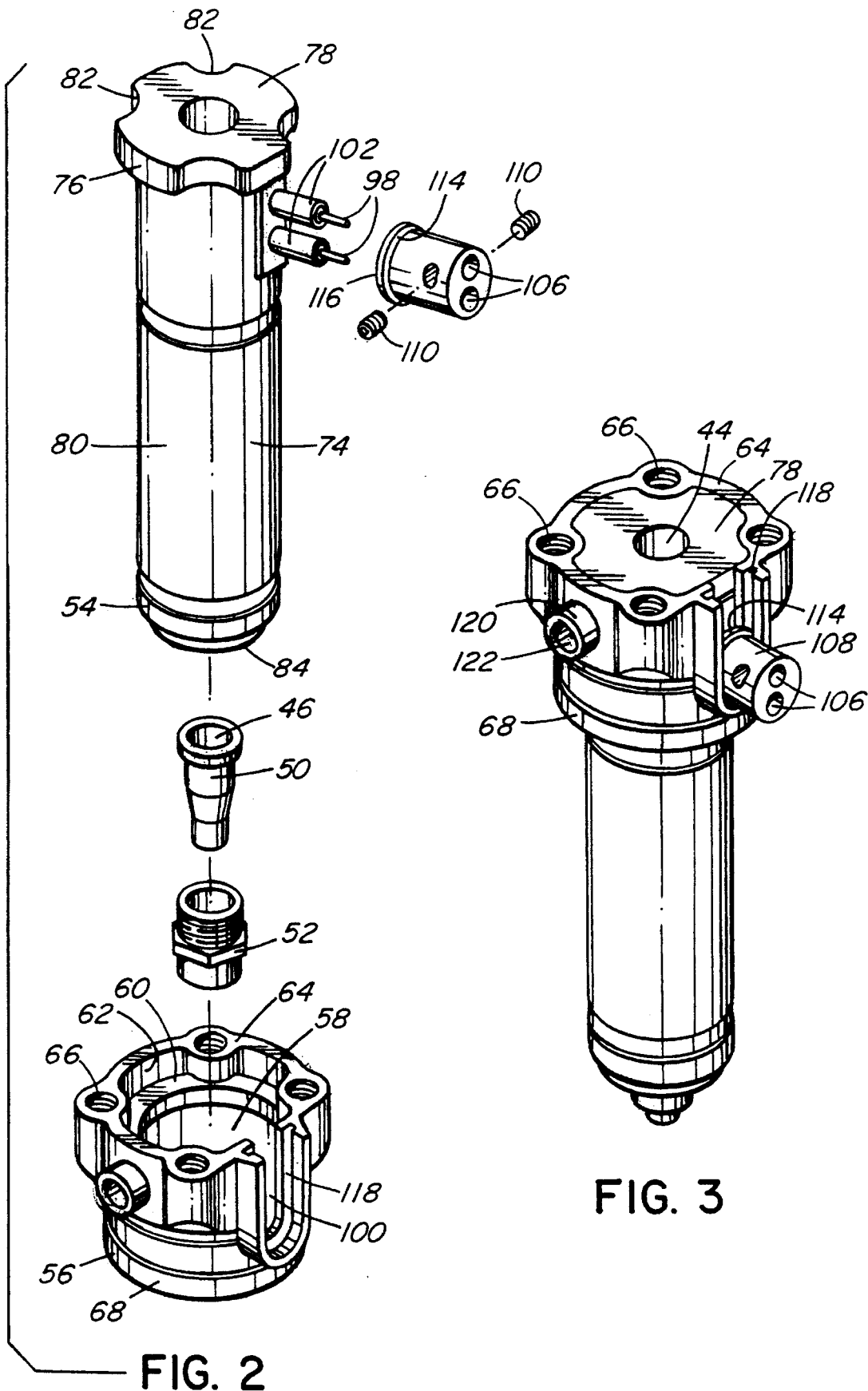
FIG. 2 is an exploded isometric view showing the components of the nozzle seen in FIG. 1 in position for assembly.
FIG. 3 is an isometric view showing the same nozzle assembled.

Also referring to FIGS. 2 and 3, each nozzle 10 has an elongated central body 54 removably seated according to the invention in a one-piece outer collar 56. The steel outer collar 56 has a central hole 58 extending therethrough with a rearward facing seat 60 extending partially around the central hole 58 to form a shallow recess 62 at the rear end 64 of the outer collar 56. Four threaded screw holes 66 in the rear end 64 of the outer collar 56 are spaced around the recess 62. The outer collar 56 has a frontwardly extending insulation flange portion 68 which sits in a circular seat 70 extending around the opening 12 in the mold to accurately locate the nozzle 10 in place with an insulative air space 72 extending between it and the surrounding cooled mold 14.

The central body 54 has an elongated central shaft portion 74 with a rear flange portion 76 extending outwardly therefrom adjacent the rear end 78 of the central body 54. The central shaft portion 74 has a generally cylindrical outer surface 80 which fits through the central hole 58 in the outer collar 56. The rear flange portion 76 as four spaced indents 82 to fit in the recess 62 at the rear end 64 of the outer collar 56. The melt channel 44 extends centrally through the central body 54 from its rear end 78 to its front end 84 in which the nozzle seal 48 is seated in a threaded seat 86. In this embodiment, the central body 54 of the nozzle 10 is made with an electrical heating element 88 having a helical portion 90 cast into a aluminum or copper alloy conductive portion 92 around a hot-work steel hollow core 94. The hollow core 94 has a threaded outer surface 96 to ensure the conductive portion 92 is securely cast around it. The helical portion 90 of the heating element 88 is generally wound with its coils closer together near the rear and front ends 78, 84 of the central body 54 where there is more heat loss. The electrical heating element 88 has terminal portions 98 which extend outwardly through a U-shaped opening 100 in the outer collar 56. In this embodiment, each of the terminal portions 98 extends through a stainless steel protective tube 102 which has its inner end 104 rigidly cast in the conductive portion 92 around the hollow core 94. The terminal portions 98 extend outwardly into holes 106 in a ceramic insulative connector 108 in which they are connected by set screws 110 to electrical leads 112 from a suitable power source. As clearly seen in FIGS. 2 and 3, the generally cylindrical connector 108 has a circular lip 114 extending outwardly at its inner end 116 which is received in a groove 118 in the U-shaped opening 100 to securely mount the connector 108 to the outer collar 56.

The nozzle 10 is assembled by sliding the ceramic connector 108 over the terminal portions 98 of the heating element 88 projecting outwardly from the central body 54. Then, as the outer collar 56 is slipped upwardly over the central body 54 to the position seen in FIG. 3, the lip 114 at the inner end 116 of the connector is fitted into the groove 118 around the U-shaped opening 100. Then the two-piece nozzle seal 48 is screwed into place. In the assembled position, the rear flange portion 76 of the central body 54 fits in the recess 62 in the outer collar 56. In some embodiments, the outer collar 56 has a spigot 120 with a hole 122 therein to receive a dowel (not shown) to prevent rotation of the nozzle 10 in the cavity plate 22. The nozzles 10 are then tightly secured to the front face 124 of the melt distribution manifold 30 by screws 126 which extend through the manifold 30 into the screw holes 66 in the outer collar 56. This ensures a tight fit to prevent melt leakage between the nozzles 10 and the manifold 30.

In use, after installation in the mold 14 as seen in FIG. 1, electrical power is applied to the heating element 36 in the manifold 30 and to the heating elements 88 in the nozzles 10 to heat them to a predetermined operating temperature. Pressurized melt is applied from a molding machine (not shown) to the central inlet 40 of the melt passage 16 according to a predetermined cycle. The melt flows through the melt distribution manifold 30, nozzles 10, nozzle seals 48, and gates 18 into the cavities 20. After the cavities 20 are filled and a suitable packing and cooling period has expired, the injection pressure is released and the melt conveying system is decompressed to avoid stringing through the open gates 18. The mold 14 is then opened to eject the molded products. After ejection, the mold 14 is closed and the cycle is repeated continuously with a cycle time dependent upon the size of the cavities 20 and the type of material being molded.

While the description of the nozzle 10 with separable central body 54 and outer collar 56 according to the invention has been given with respect to a preferred embodiment, it will be evident that various other modifications are possible without departing from the scope of the invention as understood by those skilled in the art and as defined in the following claims. For instance, the nozzles 10 can have a variety of different gating configurations.

The embodiments of the invention in which an exclusive property or privilege is claimed is defined as follows:

1. In an injection molding nozzle to be seated in a mold, the nozzle having a melt channel extending therethrough to convey melt frontwardly toward at least one gate extending through the mold to a cavity, the nozzle having an outer collar and an elongated central body with a rear end, the outer collar extending around the central body adjacent the rear end thereof and having a frontwardly extending flange portion to be received in a seat in the mold to locate the nozzle, the improvement wherein;

the elongated central body and the outer collar are separable, the outer collar is one-piece with a central hole therethrough and a rearward facing seat extending at least partially around the central hole, the central body having a central shaft portion with a rear flange portion extending outwardly therefrom adjacent the rear end of the central body, whereby the central body is removably seated in the outer collar with the central shaft portion extending through the central hole in the outer collar and the rear flange portion sitting against the seat in the central hole in the outer collar.

2. An injection molding nozzle as claimed in claim 1 wherein the central body has an integral electrical heating element with at least one terminal portion extending radially outwardly adjacent the rear end of the central body, and the outer collar has a rear end and a U-shaped opening extending therethrough adjacent the rear end to receive the terminal portion of the electrical heating element therethrough when the central body is received in the outer collar.

3. An injection molding nozzle as claimed in claim 2 wherein the terminal portion of the electrical heating element extends into a connector, the connector having an inner end and an outwardly extending lip adjacent the inner end, and the U-shaped opening has a groove extending therearound from the rear end of the collar to receive the outwardly extending lip of the connector to securely mount the connector to the collar.

\* \* \* \* \*